3,146,066
PROCESS FOR PRODUCING BERYLLIUM CHLO-
RIDE FROM BERYLLIUM OXIDE MATERIAL
Ricardo O. Bach, Gastonia, N.C., assignor to Beryllium
Metals and Chemical Corporation, Cambridge, Mass.,
a corporation of Delaware
No Drawing. Filed Feb. 6, 1962, Ser. No. 171,360
11 Claims. (Cl. 23—87)

The present invention relates to extraction processes involving beryllium ore and, more particularly, to the production of beryllium chloride, from which beryllium metal may be reduced.

In general, beryllium ores such as beryl, chrysoberyl and betrandite are relatively inert minerals that can be chemically attacked only at elevated temperatures. Such minerals contain beryllium and aluminum compounds which, although chemically similar, must be chemically separated if beryllium is to be derived. Prior difficulties are illustrated by a typical extraction process involving the reaction of beryl with sodium silicofluoride at elevated temperature to produce reaction products including a beryllium fluoride complex and isolating the beryllium fluoride complex by leaching with water. (Copaux, "Methode de traitment du beryl pour en extraire la Glucine," Comptes Rendus, Acad. Sci., Paris, vol. 168, May 24, 1919, p. 610.) Thereafter the beryllium fluoride complex in water solution is precipitated as a hydroxide, converted to an oxide and chlorinated. The resulting beryllium chloride is isolated as a gas and separated into its components by a known method such as electrolysis.

The object of the present invention is the separation of beryllium from ore by a simplified technique of unprecedented efficiency involving the production of beryllium chloride by reaction of the ore directly with silicon chloride, $SiCl_4$, or boron chloride, $BCl_3$. Preferably the reaction is effected in the presence of an alkaline earth salt, where the alkaline earth is other than Be.

Other objects of the present invention will in part be obvious and will in part appear hereinafter. For a fuller understanding of the nature and objects of the present invention reference is to be made to the following detailed disclosure.

Although the process of the present invention applies to the oxidic form of beryllium in all beryllium ores and compounds it is described below for simplicity in reference to beryl, $3BeO \cdot Al_2O_3 \cdot 6SiO_2$. The method of the present invention is based upon the following reaction:

$$3BeO \cdot Al_2O_3 \cdot 6SiO_2 + 3SiCl_4 \rightarrow 3BeCl_2 + 2AlCl_3 + 9SiO_2$$

In accordance with this reaction, only BeO and $Al_2O_3$ are chlorinated and volatilized. The residue consists essentially of pure $SiO_2$, which is not volatile and is not attacked by $SiCl_4$ at the reaction temperature. However, this reaction is not favored thermodynamically until relatively high temperatures are reached. For a specified partial pressure of $SiCl_4$ of 1 atmosphere, the partial pressure of 1 atmosphere is reached by $BeCl_2$ at approximately 1340° C. The foregoing data apply to BeO and to $Al_2O_3$ rather than to beryl. It is apparent that any discrepancies due to differences between these compounds in pure form and these compounds in the beryl structure may shift the foregoing equilibrium to higher temperatures because of the additional bond energies to be overcome.

In the foregoing reaction, the equilibrium constant $K_p$, which is unity at 1340° C., obeys the following law:

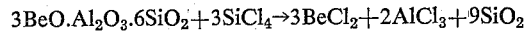

$$K_p = \frac{\text{(partial pressure of } BeCl_2\text{)}}{\text{(partial pressure of } SiCl_4\text{)}^{1/2}}$$

It will be noted that the partial pressure of $SiCl_4$ has a sharp influence on this equilibrium. For example: at 1340° C., for a partial pressure of $SiCl_4$ equal to 0.3, the partial pressure of $BeCl_2$ is 0.55; and at 1340° C., for a partial pressure of $SiCl_4$ equal to 4, the partial pressure of $BeCl_2$ is 2. It has been found that for practical results the reaction must be effected in the presence of an auxiliary salt which is an oxide, halide or carbonate of an alkali or alkaline earth metal, other than beryllium. Particularly effective for this purpose are salts of calcium, magnesium, sodium and mixtures thereof. It has been found that: for practical results the ore is supplied to the reaction in finely divided form, preferably in such form that 90% by weight passes 100 mesh; and for best results the ore is supplied to the reaction in such form that 90% by weight is finer than 100 microns in maximum extent. Preferably the ratio of ore to auxiliary salt is within the range from 1:1 to 5:1. Preferably the reaction temperature ranges from 1000 to 1550° C., best results being obtained in the range from 1350 to 1485° C.

The following non-limiting examples further illustrate the present invention:

*Example 1*

A mixture of 100 parts of finely ground beryl ore (finer than 200 mesh) and 50 parts of anhydrous $CaCl_2$ was placed in a vycor tube. A slow stream of argon, saturated at room temperature with $SiCl_4$, was passed through the tube. The region of the tube containing the mixture was held for 6 hours at 1100° C. In cool region of the tube, a white sublimate in the form of dense colorless crystals accumulated. This sublimate contained by weight $BeCl_2$ and $AlCl_3$ in the ratio 45% BeO and 55% $Al_2O_3$.

*Example 2*

2 g. of beryl ore containing 256 mg. of BeO (12.8%), of which 90% by weight was finer than 200 mesh, was heated for 220 min. at 1200 to 1460° C. in a stream of argon which was saturated at room temperature with $SiCl_4$. The quantity of $SiCl_4$ supplied through the reaction tube was 111.5 g. In the cool region of the reaction tube 15.3 mg. of BeO was recovered as $BeCl_2$, equivalent to a 6% yield. 111 g. of $SiCl_4$ was condensed in an ice-water condenser.

*Example 3*

The experiment of Example 2 was repeated except that 1 g. of $CaCl_2$ was mixed at the start in the reaction tube. As a result there was a 65% yield of $BeCl_2$. Also obtained were 147 mg. of $Al_2O_3$ as $AlCl_3$, which corresponded to approximately 41% of the total alumina in the ore. The sublimates contained all the aluminum and beryllium in the chloride form.

*Example 4*

A mixture of 4 g. of beryl ore, 90% by weight of which was finer than 200 mesh, and 1½ g. of $CaCl_2$ anhydrous was heated for 195 minutes to a temperature from 1050 to 1470° C. Argon was supplied through the reaction tube at the rate of 40 ml./min., being mixed with $SiCl_4$ at different temperatures corresponding to partial pressures of $SiCl_4$ from 420 to 660 mg. Hg. 80% of the BeO was recovered in the sublimate.

*Example 5*

A repeat experiment carried out as in Example 4, except that twice the quantities of material were used, gave a BeO yield in the sublimate of 83.5%.

*Example 6*

The experiment of Example 4 was repeated except that the heating occurred through 184 min. from 1200 to 1320° C. The BeO yield of the sublimate was 16%.

Example 7

The experiment of Example 4 was repeated except that the heating occurred through 103 min. from 1400 to 1480° C. The BeO yield of the sublimate was 51%.

Example 8

A mixture of 4 g. of beryl ore, 90% by weight of which was finer than 200 mesh, and 3 g. of $CaCl_2$ anhydrous was heated for 102 min. from 1400 to 1475° C. Argon was supplied through the reaction tube at the rate of 40 ml./min., being saturated with $SiCl_4$ at room temperature, 71% of the BeO was recovered in the sublimate.

Example 9

A mixture of finely pulverized beryl ore, of which more than 90% by weight was in the form of particles from 5 to 15 microns in maximum extent, and $CaCl_2$ being 8 to 3. The ore had a BeO content of 12.4%. The mixture was placed in a porcelain boat and introduced into a preheated furnace at approximately 400° C. Dry argon was supplied while the furnace temperature was increased to 1140° C. over a period of one hour. At this point, $SiCl_4$ was introduced in the argon carrier at 24 ml./min. (room temperature and pressure). The initial head temperature was 27° C. ($SiCl_4$ vapor pressure—250 mm. Hg) and was rapidly increased to 54° C. (710 mm. Hg) at which it was maintained for the duration of the run. The furnace attained 1400° C. 85 minutes after the $SiCl_4$ was first introduced. Heating was continued at the maximum input for 150 minutes, at which time a maximum temperature of 1525° C. was attained. The furnace was cooled slowly after the mixture had been above 1400° C. for 265 min. the residue of the mixture was snow white, lightly fritted and had shrunken in volume about 15%. $BeCl_2$ was washed from the cool region of the reaction tube, hydrolyzed and analyzed for as BeO with the following result: 440 mg. or 92.5%. The Be contained in the precipitate present in the $SiCl_4$ condensate was 3.1 mg. or in terms of BeO was 0.7%. Thus the total recovery was 93.2%.

Example 10

The experiment of Example 9 was repeated except that the pulverized beryl ore was in the form of particles of which 90% by weight were from 60 to 80 microns in maximum extent. The total yield in terms of BeO was 48%.

Example 11

The experiment of Example 9 was repeated except that the ratio of beryl ore to $CaCl_2$, was 8 to 1. The total yield in terms of BeO was 51%.

Example 12

The experiment of Example 9 was repeated except that the ratio of beryl ore to $CaCl_2$ was 8 to 3. The total yield in terms of BeO was 80%.

Example 13

The experiment of Example 9 was repeated except that the ratio of beryl ore to $CaCl_2$ was 8 to 6. The total yield in terms of BeO was 71%.

Example 14

The experiment of Example 9 was repeated except that the ratio of beryl ore to $CaCl_2$ was 8 to 12. The total yield in terms of BeO was 19%.

Example 15

The experiment of Example 9 was repeated except that the reaction temperature was 1320° C. and the reaction period was 3 hours. The total yield in terms of BeO was 16%.

Example 16

The experiment of Example 9 was repeated except that the reaction temperature was 1400° C. and the reaction period was 3 hours. The total yield in terms of BeO was 18%.

Example 17

The experiment of Example 9 was repeated except that the reaction temperature was 1480° C. and the reaction period was 3 hours. The total yield in terms of BeO was 83%.

Example 18

The experiment of Example 9 was repeated with boron chloride instead of silicon chloride. The reaction conditions were the same except that the reaction temperatures was 1030 to 1080° C. and the reaction period was 45 minutes. A 43% yield resulted.

The present invention thus provides a process capable of isolating beryllium as the chloride from its ore with a very high efficiency. Since certain changes may be made in the above disclosure without departing from the scope of the invention herein, it is intended that all matter described above be interpreted in an illustrative and not in a limiting sense.

What is claimed is:

1. A process for producing the chloride of beryllium from an inorganic oxidic form of beryllium, said process comprising the steps of reacting said oxidic form with a member of the class consisting of silicon chloride and boron chloride in conjunction with a compound of an element selected from the class consisting of the alkalis and alkaline earths other than beryllium, said compound being selected from the class consisting of the oxides, halides and carbonates, the temperature of said steps of reacting being within the range of from 1000 to 1550° C.

2. The process of claim 1 wherein said element is Mg.

3. The process of claim 1 wherein said element is Ca.

4. The process of claim 1 wherein said element is Na.

5. A process of producing the chloride of beryllium from a beryllium ore, said process comprising the steps of dividing said ore into a powder, effecting a reaction between said ore and a member of the class consisting of silicon chloride and boron chloride, in conjunction with a compound of an element selected from the class consisting of the alkalis and alkaline earths other than beryllium, said compound being selected from the class consisting of the oxides, halides and carbonates, the temperature of said reaction being within the range of from 1000 to 1550° C., and isolating said chloride of beryllium as a gas, the residue including unreacted $SiO_2$.

6. The process of claim 5 wherein said powder is substantially finer than 200 mesh.

7. The process of claim 5 wherein the temperature of the reaction ranges from 1000 to 1550° C.

8. The process of producing the chloride of beryllium from beryl ore, said process comprising the steps of pulverizing said ore into a powder of which 90% by weight is finer than 100 microns in maximum extent, reacting said powder with a member of the class consisting of silicon chloride and boron chloride, in conjunction with a compound of an element selected from the class consisting of the alkalis and alkaline earths, said element being other than beryllium, said compound being selected from the class consisting of the oxides, halides and carbonates, at a temperature ranging from 1350 to 1485° C., and isolating said chloride of beryllium as a gas, the residue including unreacted $SiO_2$.

9. The process of claim 8 wherein said salt is a magnesium compound.

10. The process of claim 8 wherein said salt is a calcium compound.

11. The process of claim 8 wherein said compound is a mixture of at least two of the class consisting of compounds of sodium, calcium and magnesium.

(References on following page)

References Cited in the file of this patent

UNITED STATES PATENTS

| | | |
|---|---|---|
| 1,392,046 | Booth et al. | Sept. 27, 1921 |
| 1,893,331 | Kangro et al. | Jan. 3, 1933 |
| 2,081,984 | Claflin | June 1, 1937 |
| 2,567,419 | Bengtson | Sept. 11, 1951 |

OTHER REFERENCES

Mellor: Comprehensive Treatise on Inorganic and Theoretical Chemistry, volume 6, page 967 (1925). Longmans, Green and Company, New York.

Rauter: J. Liebig's Annalen der Chemie, volume 270, page 247 (1892).

Friedel et al.: Annalen der Chemie and Pharmacie (Wohler, Liebig, and Kopp), volume 147, page 360 (1868).